(12) United States Patent
Miyakawa et al.

(10) Patent No.: US 11,577,452 B2
(45) Date of Patent: Feb. 14, 2023

(54) PHOTOCURABLE COMPOSITION AND METHOD OF MANUFACTURING THREE-DIMENSIONAL OBJECT

(71) Applicants: NIKON CORPORATION, Tokyo (JP); ESSILOR INTERNATIONAL, Charenton-le-Pont (FR)

(72) Inventors: Akiko Miyakawa, Tokyo (JP); Masafumi Mizuguchi, Tokyo (JP)

(73) Assignees: NIKON CORPORATION, Tokyo (JP); ESSILOR INTERNATIONAL, Charenton-le-Pont (FR)

( * ) Notice: Subject to any disclaimer, the term of this patent is extended or adjusted under 35 U.S.C. 154(b) by 378 days.

(21) Appl. No.: 16/634,237

(22) PCT Filed: Jul. 28, 2017

(86) PCT No.: PCT/JP2017/027405
§ 371 (c)(1),
(2) Date: Jan. 27, 2020

(87) PCT Pub. No.: WO2019/021451
PCT Pub. Date: Jan. 31, 2019

(65) Prior Publication Data
US 2021/0087315 A1    Mar. 25, 2021

(51) Int. Cl.
*B29C 64/124* (2017.01)
*B33Y 70/00* (2020.01)
(Continued)

(52) U.S. Cl.
CPC ............ *B29C 64/124* (2017.08); *B33Y 70/00* (2014.12); *C08F 220/1811* (2020.02);
(Continued)

(58) Field of Classification Search
CPC ....... B29C 64/124; B33Y 70/00; B33Y 10/00; C08F 220/1811; C08F 222/102; B29K 2033/12; B29K 2105/0002
See application file for complete search history.

(56) References Cited

U.S. PATENT DOCUMENTS 5,442,022 A    8/1995  Keita et al.
5,741,831 A *  4/1998  Keita .................... C08F 228/02
                                                    522/180
(Continued)

FOREIGN PATENT DOCUMENTS

JP    H03-227222 A    10/1991
JP    2014-114406 A    6/2014
(Continued)

OTHER PUBLICATIONS

English translation of JP-2016112824-A by EPO. (Year: 2016).*
(Continued)

*Primary Examiner* — Leith S Shafi
*Assistant Examiner* — Inja Song
(74) *Attorney, Agent, or Firm* — Oliff PLC

(57) ABSTRACT

A photocurable composition which can be used to manufacture a three-dimensional object that is formed by stacking a plurality of layers on top of each other, from which the three-dimensional object having excellent transparency, a high glass transition temperature, and a high hardness can be formed, and which exhibits a high curing rate. The photocurable composition is a photocurable composition used to manufacture a three-dimensional object that is formed by stacking a plurality of layers on top of each other. The photocurable composition contains a monofunctional monomer having a polycyclic aliphatic group, a polyfunctional monomer, an alcohol, and an acylphosphine oxide photopolymerization initiator.

13 Claims, 2 Drawing Sheets

(51) Int. Cl.
*C08F 222/10* (2006.01)
*C08F 220/18* (2006.01)
*B33Y 10/00* (2015.01)
*B29K 33/00* (2006.01)
*B29K 105/00* (2006.01)

(52) U.S. Cl.
CPC ...... *C08F 222/102* (2020.02); *B29K 2033/12* (2013.01); *B29K 2105/0002* (2013.01); *B33Y 10/00* (2014.12)

(56) References Cited

U.S. PATENT DOCUMENTS

| | | | | |
|---|---|---|---|---|
| 6,572,794 | B1 * | 6/2003 | Berzon | C08F 2/46 |
| | | | | 264/492 |
| 7,420,743 | B2 | 9/2008 | Lai et al. | |
| 2003/0100672 | A1 * | 5/2003 | Tardieu | C08F 2/44 |
| | | | | 524/774 |
| 2015/0277146 | A1 * | 10/2015 | Crespo Vázquez | G02C 7/027 |
| | | | | 264/1.36 |
| 2016/0167323 | A1 | 6/2016 | Valeri et al. | |
| 2016/0272746 | A1 | 9/2016 | Utsunomiya | |
| 2019/0315959 | A1 * | 10/2019 | Hazell | B33Y 10/00 |

FOREIGN PATENT DOCUMENTS

| | | | |
|---|---|---|---|
| JP | 2014114406 A | * | 6/2014 |
| JP | 2016-112824 A | | 6/2016 |
| JP | 2016112824 A | * | 6/2016 |
| JP | 2016-196104 A | | 11/2016 |
| WO | 2014/148148 A1 | | 9/2014 |
| WO | 2015/014380 A1 | | 2/2015 |

OTHER PUBLICATIONS

OA Appendix: supplement of the English translation of JP 2016-112824 A (para. [0112]: Table 1) by PTO translation service. (Year: 2016).*
Material Property of "TMPTA (Trimethylol propane triacrylate)" by Wikipedia (available at https://en.wikipedia.org/w/index.php?title=Trimethylolpropane_triacrylate&oldid=758252919, published in public on Jan. 4, 2017) (Year: 2017).*
English translation of JP-2014114406-A by EPO (OA Appendix). (Year: 2014).*
Feb. 2, 2021 Extended European Search Report issued in International Patent Application No. 17919478.2.
Heinrich Andreas et al. "Additive Manufacturing of Optical Components." Advanced Optical Technology, vol. 5, pp. 293-301, 2016.
Jan. 28, 2020 International Preliminary Report on Patentability issued in International Patent Application No. PCT/JP2017/027405.
Oct. 17, 2017 International Search Report issued in International Patent Applciation No. PCT/JP2017/027405.

* cited by examiner

[Fig. 1]
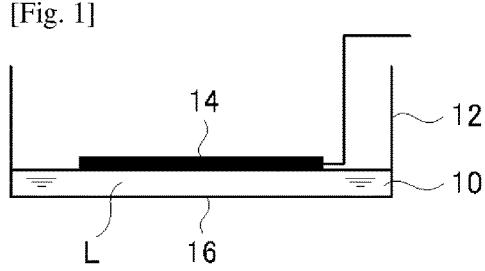
[Fig. 2]
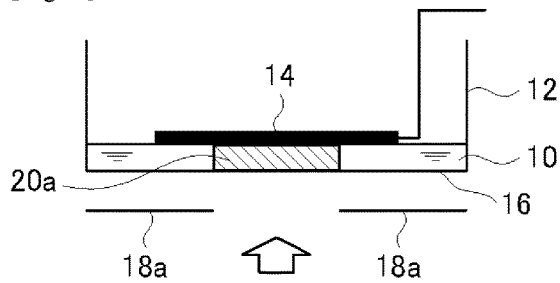
[Fig. 3]
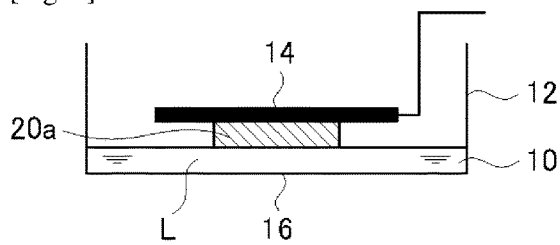
[Fig. 4]
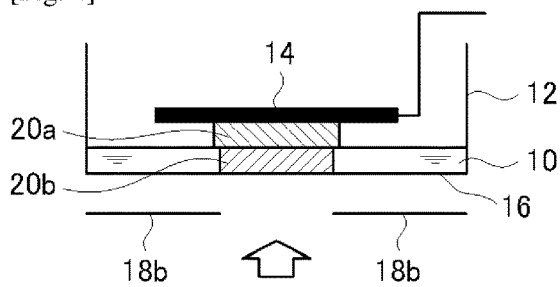
[Fig. 5]
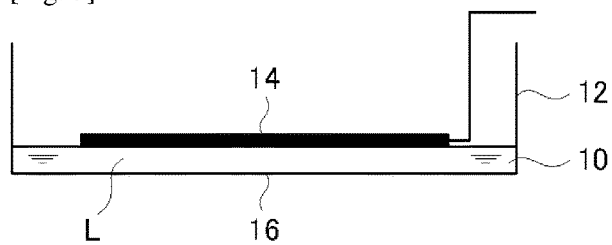
[Fig. 6]
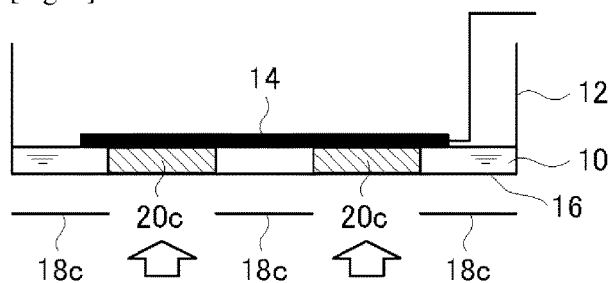

[Fig. 7]
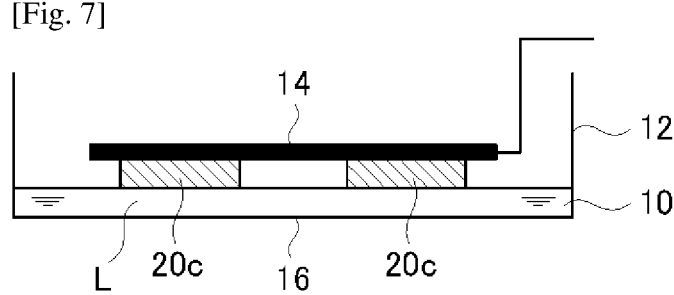
[Fig. 8]
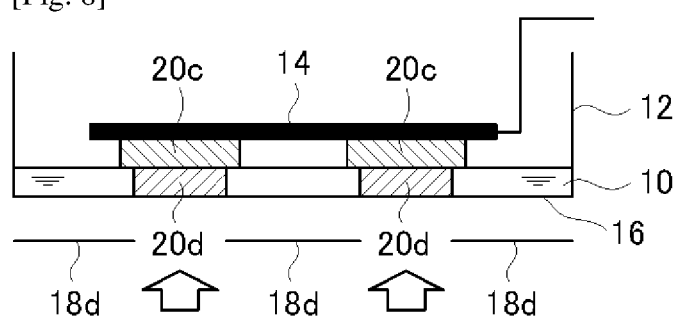
[Fig. 9]
[Fig. 10]
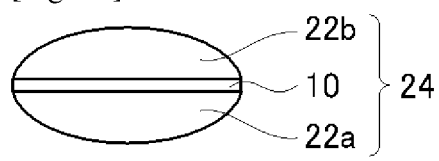

PHOTOCURABLE COMPOSITION AND METHOD OF MANUFACTURING THREE-DIMENSIONAL OBJECT

TECHNICAL FIELD

The present disclosure relates to a photocurable composition, and a method of manufacturing a three-dimensional object.

BACKGROUND ART

A method of optically forming a photocurable composition into a three-dimensional shape (this process is hereinafter also referred to simply as "stereolithography") has recently been studied as a method capable of manufacturing a three-dimensional object with good dimensional accuracy without using a mold (e.g., PTL 1). According to this method, a plurality of layers are stacked on top of each other to manufacture a three-dimensional object. More specifically, after a three-dimensional object model is divided into a large number of two-dimensional cross-sectional layers, cross-sectional members corresponding to the respective two-dimensional cross-sectional layers are successively formed using a photocurable composition and successively stacked on top of each other to form a three-dimensional object.

CITATION LIST

Patent Literature

[PTL 1] JP 3-227222 A

SUMMARY OF INVENTION

The present disclosure relates to a photocurable composition used to manufacture a three-dimensional object which is formed by stacking a plurality of layers on top of each other, the photocurable composition containing a monofunctional monomer having a polycyclic aliphatic group, a polyfunctional monomer, an alcohol, and an acylphosphine oxide photopolymerization initiator.

The present disclosure also relates to a three-dimensional object-manufacturing method including: a step A of manufacturing a stacked object having a plurality of cured layers stacked on top of each other by repeating a step of forming a liquid layer of the photocurable composition and a step of forming a cured layer through selective irradiation of the liquid layer with light in this order; and a step B of obtaining a three-dimensional object through irradiation of the stacked object with light at an exposure amount of at least 3,000 mJ/cm².

The present disclosure further relates to a three-dimensional object-manufacturing method, comprising: a step D of manufacturing a plurality of stacked objects each having a plurality of cured layers stacked on top of each other by repeating a step D1 and a step D2 in this order, the step D1 including forming a liquid layer of the photocurable composition, and the step D2 including forming a cured layer through selective irradiation of the liquid layer with light; a step E of coating surfaces of the plurality of stacked objects obtained in the step D with the photocurable composition used in the step D1; a step F of irradiating each of the plurality of stacked objects coated with the photocurable composition with light; and a step G of bonding together the plurality of stacked objects obtained in the step F through the photocurable composition used in the step D1 and irradiating a resulting bonded object with light to obtain a three-dimensional object, wherein an exposure amount for light irradiation in the step F or the step G is at least 3,000 mJ/cm², or wherein a step H of irradiating each of the plurality of stacked objects with light at an exposure amount of at least 3,000 mJ/cm² is included between the step D and the step E.

BRIEF DESCRIPTION OF DRAWINGS

FIG. 1 is a view illustrating a procedure of a step A in a three-dimensional object-manufacturing method.

FIG. 2 is a view illustrating a procedure of the step A in the three-dimensional object-manufacturing method.

FIG. 3 is a view illustrating a procedure of the step A in the three-dimensional object-manufacturing method.

FIG. 4 is a view illustrating a procedure of the step A in the three-dimensional object-manufacturing method.

FIG. 5 is a view illustrating a procedure of a step D in another three-dimensional object-manufacturing method.

FIG. 6 is a view illustrating a procedure of the step D in the three-dimensional object-manufacturing method.

FIG. 7 is a view illustrating a procedure of the step D in the three-dimensional object-manufacturing method.

FIG. 8 is a view illustrating a procedure of the step D in the three-dimensional object-manufacturing method.

FIG. 9 illustrates an example of a stacked object obtained by a step F.

FIG. 10 is a view illustrating a procedure of a step G.

DESCRIPTION OF EMBODIMENTS

A photocurable composition, and a method of manufacturing a three-dimensional object are described below in detail with reference to embodiments.

In the specification, a hyphen (-) is used to mean that numerical values before and after the hyphen are included as a lower limit value and an upper limit value, respectively.

When a photocurable composition is to be applied to stereolithography, the photocurable composition is required to have excellent curability. The expression "excellent curability" refers to a high curing rate, and corresponds to a low Ec in Examples to be described later. A three-dimensional object is required to have excellent transparency from the viewpoint that the three-dimensional object formed is applied to an optical member. Further, the three-dimensional object is also required to have a high glass transition temperature and a high hardness in terms of ease of handling. In general, however, a composition desirably has a high optical absorption ability to satisfy excellent curability, and it has therefore been difficult in principle to satisfy excellent curability and excellent transparency at the same time.

Conventional techniques could not provide the photocurable composition as described above which can be used to manufacture a three-dimensional object that is formed by stacking a plurality of layers on top of each other, from which the three-dimensional object having excellent transparency, a high glass transition temperature, and a high hardness can be formed, and which exhibits a high curing rate. Then, a photocurable composition having the above-mentioned properties has been desired.

In the photocurable composition according to this embodiment, the above-mentioned problem is solved by using a predetermined monomer, an alcohol, and an acylphosphine oxide photopolymerization initiator. As will be described later in detail, selection of the predetermined monomer allows a three-dimensional object to satisfy the desired properties.

An exemplary method for enhancing the curability of a photocurable composition to make the photocurable composition applicable to stereolithography is a method in which a polymerization initiator is used in large quantity. According to this method, however, the polymerization initiator used in large quantity is likely to cause coloring of a three-dimensional object to impair the transparency. In this regard, since the acylphosphine oxide photopolymerization initiator has a photobleaching function, this function is used to achieve both the transparency and the curability.

Excellent transparency of the three-dimensional object is also achieved by further using an alcohol in combination with the above-mentioned acylphosphine oxide photopolymerization initiator.

Respective ingredients contained in the photocurable composition are first described below in detail, and procedures of a three-dimensional object-manufacturing method are then described in detail.

<Monofunctional Monomer Having Polycyclic Aliphatic Group>

The photocurable composition contains a monofunctional monomer having a polycyclic aliphatic group (hereinafter also referred to simply as "specific monofunctional monomer"). The specific monofunctional monomer mainly contributes to improving the transparency and the glass transition temperature of a three-dimensional object obtained.

The polycyclic aliphatic group is a monovalent group formed by condensation of a plurality of alicyclic groups.

The number of monocyclic aliphatic groups included in the polycyclic aliphatic group is not particularly limited, and is preferably 2-5 and more preferably 2-4 from the viewpoint that the transparency and the glass transition temperature of the three-dimensional object are further improved.

The number of carbon atoms in the polycyclic aliphatic group is not particularly limited, and is preferably 5-20 and more preferably 6-15 from the viewpoint that the transparency and the glass transition temperature of the three-dimensional object are further improved.

Examples of the polycyclic aliphatic group include saturated polycyclic aliphatic groups such as bicyclo[2.1.0]pentanyl group, bicyclo[2.2.0]hexanyl group, bicyclo[2.2.1]heptanyl group (norbornyl group), bicyclo[2.2.2]octanyl group, tricyclo[3.3.1.1$^{3,7}$]decanyl group (adamantyl group), and tricyclo[5.2.1.0$^{2,6}$]decanyl group; and unsaturated polycyclic aliphatic groups such as bicyclo[2.1.0]pentenyl group, bicyclo[2.2.0]hexenyl group, bicyclo[2.2.1]heptenyl group (norbornenyl group), bicyclo[2.2.1]heptadienyl group, bicyclo[2.2.2]octenyl group, bicyclo[2.2.2]octadienyl group, and bicyclo[2.2.2]octatrienyl group.

The specific monofunctional monomer has a polymerizable group. The type of the polymerizable group is not particularly limited and examples thereof include a radical polymerizable group and a cationic polymerizable group. A radical polymerizable group is preferred in terms of reactivity.

Examples of the radical polymerizable group include acryloyloxy group ($CH_2$=CH—CO—O—), methacryloyloxy group ($CH_2$=C($CH_3$)—CO—O—), styryl group, and allyl group. Examples of the cationic polymerizable group include epoxy group, oxetanyl group, and vinyloxy group.

A preferred example of the specific monofunctional monomer is a compound represented by formula (4):

  Formula (4)

$R_{10}$ represents a polymerizable group. The polymerizable group is as defined above.

L represents a single bond or a divalent linking group. The divalent linking group may be, for example, a divalent aliphatic hydrocarbon group (which may be linear, branched or cyclic, and preferably contains 1-20 carbon atoms, specific examples thereof including an alkylene group, an alkenylene group, and alkynylene group), a divalent aromatic hydrocarbon group, —O—, —S—, —SO$_2$—, —NR$_a$—, —CO—, —N=N—, —CH=N—, and a combination group of two or more thereof (e.g., -alkylene group-O—, -(alkylene group-O)$_n$— (n is two or more), -alkylene group-COO—). R$_d$ as used herein represents a hydrogen atom or an alkyl group.

$R_{11}$ represents a polycyclic aliphatic group. The polycyclic aliphatic group is as defined above.

<Polyfunctional Monomer>

The photocurable composition contains a polyfunctional monomer. The polyfunctional monomer mainly contributes to improving the glass transition temperature and the hardness of a three-dimensional object.

The polyfunctional monomer refers to a compound having a plurality of (two or more) polymerizable groups. The number of polymerizable groups in the polyfunctional monomer is not particularly limited and is preferably 2-10 and more preferably 2-4.

The polymerizable group is as defined above for the above-mentioned specific monofunctional monomer.

The density (g/cm$^3$) of the polyfunctional monomer is not particularly limited and is often at least 0.95. The density of the polyfunctional monomer is preferably at least 1.00 from the viewpoint that the glass transition temperature of a three-dimensional object is further improved. The upper limit is not particularly limited and is often up to 1.20.

The type of the polyfunctional monomer is not particularly limited, and examples thereof include a polyfunctional monomer having a monocyclic or polycyclic aliphatic ring, a polyfunctional monomer having an alkylene group containing 3-12 carbon atoms, and a polyfunctional monomer having an aromatic ring group.

A preferred example of the polyfunctional monomer is a compound represented by formula (2):

  Formula (2)

In formula (2), each $R_{10}$ independently represents a polymerizable group. The polymerizable group is as defined above for the above-mentioned specific monofunctional monomer.

$L_1$ represents a divalent group containing a structure represented by formula (A), or an alkylene group containing 3-8 (and preferably 4-6) carbon atoms. * represents a bonding position.

[Chem. 1]

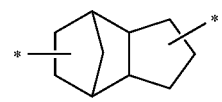  Formula (A)

The divalent group containing a structure represented by formula (A) need only contain the structure represented by formula (A) above, and an example thereof includes a group represented by formula (A-1).

[Chem. 2]

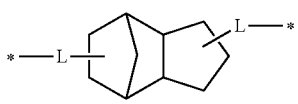

Formula (A-1)

In formula (A-1), each L independently represents a single bond or a divalent linking group. The divalent linking group is as defined above for the above-mentioned L in formula (4). In particular, L is preferably a divalent aliphatic hydrocarbon group, more preferably an alkylene group, and even more preferably an alkylene group containing 1-2 carbon atoms.

Another preferred example of the polyfunctional monomer is a compound represented by formula (3):

$$R_{10}\text{-}L_2\text{-}R_{10} \qquad \text{Formula (3)}$$

In formula (3), each $R_{10}$ independently represents a polymerizable group. The polymerizable group is as defined above for the above-mentioned specific monofunctional monomer.

$L_2$ represents a divalent group containing an adamantane ring structure or a divalent group containing a structure represented by formula (B). * represents a bonding position.

[Chem. 3]

Formula (B)

The divalent group containing an adamantane ring structure need only contain the adamantane ring structure, and an example thereof includes a group represented by formula (C).

[Chem. 4]

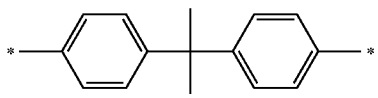

Formula (C)

In formula (C), each L independently represents a single bond or a divalent linking group. The divalent linking group is as defined above for the above-mentioned L in formula (4).

As shown in formula (C) above, each L may be bonded at any bonding position on the adamantane ring.

The divalent group containing a structure represented by formula (B) need only contain the structure represented by formula (B), and an example thereof includes a group represented by formula (B-1).

[Chem. 5]

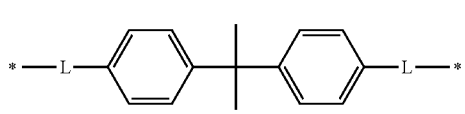

Formula (B-1)

In formula (B-1), each L independently represents a single bond or a divalent linking group. The divalent linking group is as defined above for the above-mentioned L in formula (4). L is preferably a polyoxyalkylene group. When each of two Ls is a polyoxyalkylene group, the total number of oxyalkylene units in the two Ls is preferably 2-20, more preferably 2-10, and even more preferably 2-5.

<Alcohol>

The photocurable composition contains an alcohol. The alcohol mainly contributes to improving the transparency of a three-dimensional object.

The alcohol should be a hydroxy group-containing compound, and examples of the alcohol include a saturated alcohol and an unsaturated alcohol. In particular, the alcohol is preferably an unsaturated alcohol, and more preferably a compound represented by formula (1) because the transparency of a three-dimensional object is more improved.

[Chem. 6]

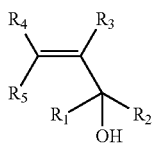

Formula (1)

In formula (1), $R_1$ and $R_2$ each represent a hydrogen atom, or one of $R_1$ and $R_2$ represents a hydrogen atom, and the other is taken together with $R_5$ to form a ring. The type of the ring to be formed is not particularly limited, and an aliphatic ring is preferred.

When one of $R_1$ and $R_2$ represents a hydrogen atom, and the other is taken together with $R_5$ to form a ring, a compound represented by formula (1-1) is preferred as the compound represented by formula (1) above.

[Chem. 7]

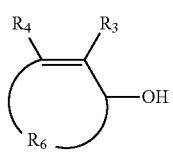

Formula (1-1)

$R_6$ represents an alkylene group optionally substituted with an alkyl group.

The number of carbon atoms in the alkylene group is not particularly limited, and is preferably 3-8.

The alkyl group with which the alkylene group may be substituted may be linear or branched. The number of carbon atoms in the alkyl group is not particularly limited, and is preferably 1-4.

$R_3$ to $R_5$ each independently represent a hydrogen atom or an alkyl group optionally substituted with a hydroxy group.

The number of carbon atoms in the alkyl group is not particularly limited, and is preferably 1-10, and more preferably 1-5.

The alkyl group may contain an ether group (—O—), an ester group (—COO—), or a ketone group (—CO—). For example, when the alkyl group contains an ether group, an example thereof includes a group represented by —$R_{10}$—O—$R_{11}$. $R_{10}$ represents an alkylene group, and $R_{11}$ represents an alkyl group.

Examples of the compound represented by formula (1) include allyl alcohol, methallyl alcohol, crotyl alcohol, croton alcohol, 2-cyclohexen-1-ol, trans-2-hexen-1-ol, cis-2-butene-1,4-diol, and 3-methyl-2-buten-1-ol.

<Acylphosphine Oxide Photopolymerization Initiator>

The photocurable composition contains an acylphosphine oxide photopolymerization initiator (hereinafter also referred to simply as "specific initiator"). As described above, the specific initiator has the photobleaching function that causes photofading through light irradiation. Therefore, a three-dimensional object having excellent transparency is obtained by the procedures to be described later in which a stacked object having a plurality of cured layers stacked on top of each other is formed using the photocurable composition containing the specific initiator, and the stacked object is then irradiated with light to fade colors derived from the specific initiator.

Examples of the acylphosphine oxide photopolymerization initiator include a monoacylphosphine oxide photopolymerization initiator and a bisacylphosphine oxide photopolymerization initiator.

Examples of the monoacylphosphine oxide photopolymerization initiator include 2,4,6-trimethylbenzoyl-diphenylphosphine oxide and 2,4,6-trimethylbenzoyl-phenylethoxyphosphine oxide.

Examples of the bisacylphosphine oxide photopolymerization initiator include bis(2,4,6-trimethylbenzoyl)-phenylphosphine oxide and bis(2,6-dimethoxybenzoyl)-2,4,4-trimethylpentyl-phosphine oxide.

(Other Ingredients)

As long as predetermined effects are not impaired, the photocurable composition may contain ingredients other than the above-mentioned ingredients (the specific monofunctional monomer, the polyfunctional monomer, the alcohol, and the specific initiator). Examples of the other ingredients include an ultraviolet absorber, an antiaging agent, a film adjusting agent, a light stabilizer, an antioxidant, a coloration preventing agent, a filler, a coloring agent, and an internal mold release agent.

The photocurable composition may contain a monofunctional monomer other than the specific monofunctional monomer.

The photocurable composition is substantially free of a high-molecular compound. When the photocurable composition is substantially free of a high-molecular compound, the viscosity and the adhesion of the photocurable composition are reduced, and the photocurable composition has excellent handling properties.

The high-molecular compound refers to a compound having a molecular weight of 2,000 or more. When the compound is polydisperse in molecular weight, whether a compound of interest is a high-molecular compound is determined by whether its weight-average molecular weight is up to 2,000.

The expression "substantially free of a high-molecular compound" means that the high-molecular compound content of the photocurable composition is up to 3 wt % with respect to the total weight of the photocurable composition, and the high-molecular compound content is preferably up to 1 wt %, and more preferably 0 wt %.

The photocurable composition is preferably substantially free of solvents other than the alcohol. The solvents other than the alcohol do not include a polymerizable group-containing compound.

The expression "substantially free of solvents" means that the solvent content of the photocurable composition is up to 10 wt % with respect to the total weight of the photocurable composition, and the solvent content is preferably up to 5 wt %, and more preferably 0 wt %.

<Photocurable Composition>

The photocurable composition contains the above-mentioned ingredients.

The method of producing the photocurable composition is not particularly limited, and for example, the above-mentioned ingredients may be mixed at a time, or the respective ingredients may be separately mixed in a stepwise fashion.

When the ingredients are mixed, the ingredients may be mixed under a heating condition, if necessary.

The specific monofunctional monomer content of the photocurable composition is not particularly limited, and is preferably 5-95 wt % and more preferably 20-95 wt % with respect to the total weight of the photocurable composition in terms of more excellent physical property balance of the three-dimensional object to be obtained.

The specific monofunctional monomers may be used singly or in combination of two or more. When two or more specific monofunctional monomers are used, the total content of the two or more specific monofunctional monomers is preferably within the above-mentioned range.

The polyfunctional monomer content of the photocurable composition is not particularly limited, and is preferably 5-95 wt % and more preferably 20-95 wt % with respect to the total weight of the photocurable composition in terms of more excellent physical property balance of the three-dimensional object to be obtained.

The polyfunctional monomers may be used singly or in combination of two or more. When two or more polyfunctional monomers are used, the total content of the two or more polyfunctional monomers is preferably within the above-mentioned range.

The alcohol content of the photocurable composition is not particularly limited, and is preferably 0.1-10 wt % and more preferably 2-4 wt % with respect to the total weight of the photocurable composition in terms of more excellent physical property balance of the three-dimensional object to be obtained.

The alcohols may be used singly or in combination of two or more. When two or more alcohols are used, the total content of the two or more alcohols is preferably within the above-mentioned range.

The specific initiator content of the photocurable composition is not particularly limited, and is preferably 0.1-5 wt % and more preferably 0.5-3 wt % with respect to the total weight of the photocurable composition in terms of more excellent physical property balance of the three-dimensional object to be obtained.

The specific initiators may be used singly or in combination of two or more. When two or more specific initiators are used, the total content of the two or more specific initiators is preferably within the above-mentioned range.

The specific monofunctional monomer and the polyfunctional monomer may be contained in the photocurable composition in any total amount without particular limitation, but the total content is preferably at least 90 wt % and more preferably at least 95 wt % with respect to the total weight of the photocurable composition in terms of more excellent physical property balance of the three-dimensional object to be obtained. The upper limit is not particularly limited and is often up to 99.5 wt %.

The weight ratio of the specific initiator to the alcohol (specific initiator content (weight)/alcohol content (weight)) is not particularly limited, and is preferably 0.1-10 and more preferably 0.2-5 in terms of more excellent physical property balance of the three-dimensional object to be obtained.

A preferred example of the photocurable composition is an example X in which the polyfunctional monomer is a compound represented by formula (2) above, and the alcohol content is 2-4 wt % with respect to the total weight of the photocurable composition. The transparency of the three-dimensional object is more excellent according to the example X. In the example X, the specific monofunctional monomer content of the photocurable composition is preferably 15-55 wt % with respect to the total weight of the photocurable composition, and the polyfunctional monomer content of the photocurable composition is preferably 40-80 wt % with respect to the total weight of the photocurable composition.

Another preferred example of the photocurable composition is an example Y in which the polyfunctional monomer is a compound represented by formula (3) above, and the specific monofunctional monomer content is at least 75 wt % with respect to the total weight of the photocurable composition. The transparency and the glass transition temperature of the three-dimensional object are more excellent according to the example Y. The upper limit of the specific monofunctional monomer content in the example Y is not particularly limited and is often up to 95 wt %.

The photocurable composition is usually in a liquid form. Although the viscosity at 25° C. of the photocurable composition is not particularly limited, the viscosity is preferably up to 200 mPa·s, more preferably up to 150 mPa s and even more preferably up to 100 mPa·s in terms of advantageous applicability to stereolithography. The lower limit is not particularly limited, and is preferably at least 5 mPa s in terms of ease of handling.

The viscosity of the photocurable composition is measured at 25° C. using a viscometer (VM-10A manufactured by Sekonic Corporation).

The internal transmittance of the photocurable composition per 1 cm thickness at 385 nm is not particularly limited, and is preferably less than 1% in terms of optical absorption. The lower limit is not particularly limited.

The measurement method of the internal transmittance involves measuring the internal transmittance using a spectrophotometer U4100 (Hitachi High-Technologies Corporation).

<Method of Manufacturing Three-Dimensional Object>

The above-mentioned photocurable composition can be advantageously applied to manufacture a three-dimensional object which is formed by stacking a plurality of layers on top of each other. The three-dimensional object-manufacturing method using the photocurable composition is described below for each embodiment.

First Embodiment

A first embodiment of the three-dimensional object-manufacturing method has steps A and B as described below.

Step A: a step of manufacturing a stacked object having a plurality of cured layers stacked on top of each other by repeating a step A1 and a step A2 in this order, the step A1 including forming a liquid layer of the photocurable composition and the step A2 including forming a cured layer through selective irradiation of the liquid layer with light;

Step B: a step of obtaining a three-dimensional object through irradiation of the stacked object with light at an exposure amount of at least 3,000 mJ/cm$^2$.

The steps A and B are described below in detail.

Procedures of the step A are described by way of example using FIG. 1 to FIG. 4. FIG. 1 to FIG. 4 are schematic side views illustrating the respective procedures (respective steps) of the step A.

First, as illustrated in FIG. 1, a liquid tank 12 containing a liquid photocurable composition 10 is prepared. The material of the liquid tank 12 is not particularly limited as long as a light transmissive material is used. Examples thereof include glass and resin.

A forming stage 14 capable of moving up and down is provided inside the liquid tank 12 at such a position as to have a predetermined height (for example, about 0.01-0.2 mm) from a bottom surface 16 of the liquid tank 12. A liquid layer L of the photocurable composition is thus formed between a lower surface of the forming stage 14 and the bottom surface 16 of the liquid tank 12 (this step corresponds to the step A1).

Next, as illustrated in FIG. 2, a mask 18a is provided under the liquid tank 12 based on the shape of a three-dimensional object to be manufactured. As a result of light irradiation from the lower side of the mask 18a, light that was not blocked out by the mask 18a reaches the liquid layer L of the photocurable composition inside the liquid tank 12 to cure the liquid layer L, thus forming a cured layer 20a on the lower surface of the forming stage 14. In other words, the liquid layer L is selectively irradiated with light to form the cured layer 20a (this step corresponds to the step A2).

The type of light to be used is not particularly limited as long as the light has a wavelength at which the photocurable composition is cured. Examples of the light include ultraviolet light and visible light. Light at a wavelength of at least 350 nm but less than 400 nm is preferred in terms of the ease of device and optical system construction, and the curability of the liquid layer.

The light source for light irradiation is also not particularly limited, and examples thereof include an LED, an LD, a high pressure mercury lamp, an ultrahigh pressure mercury lamp, a metal halide lamp, a halogen lamp, and a xenon lamp.

Next, as illustrated in FIG. 3, the forming stage 14 is moved upward by a distance corresponding to one layer (for example, about 0.1-0.2 mm) with respect to the bottom surface 16 of the liquid tank 12, and the photocurable composition 10 is introduced under the cured layer 20a to form a new liquid layer L of the photocurable composition 10 between a lower surface of the cured layer 20a and the bottom surface 16 of the liquid tank 12 (this step corresponds to the step A1).

Next, as illustrated in FIG. 4, a mask 18b is provided under the liquid tank 12 based on the shape of the three-dimensional object to be manufactured. As a result of light irradiation from the lower side of the mask 18b, light that was not blocked out by the mask 18b reaches the liquid layer L of the photo-curable composition inside the liquid tank 12 to cure the liquid layer L, thus forming a cured layer 20b on the lower side of the cured layer 20a (this step corresponds to the step A2).

The steps in FIG. 3 and FIG. 4 are subsequently repeated to allow a plurality of cured layers to be integrally stacked to manufacture a three-dimensionally stacked object. In other words, a stacked object having a plurality of cured layers stacked on top of each other can be manufactured by repeating the step A1 and the step A2.

The size of the stacked object is not particularly limited, and is on the scale of usually a few millimeters to a few meters, and typically a few centimeters to a few tens of centimeters.

The shape of masks used in the above operation can be designed from data of a group of cross-sections obtained by slicing three-dimensional CAD data of a three-dimensional object to be formed into a plurality of layers.

The above description refers to the mode of light irradiation from the lower side of the liquid tank. However, this is not the sole mode but light irradiation may be performed from a lateral side or an upper side of the liquid tank. When light irradiation is performed from the upper side of the liquid tank, for example, cured layers are stacked on the upper side of the forming stage, and the stacking operation is therefore repeated by moving the forming stage downward.

Although the light irradiation method using masks has been described above, other methods may be used. For example, a method in which the liquid layer L is selectively irradiated with light while scanning with laser light or convergent light obtained with the use of lenses may be used. Alternatively, a method in which light patterned using a digital mirror device or a liquid crystal device is used for irradiation may be used.

The exposure amount for light irradiation of the liquid layer in the step A2 is not particularly limited, and is preferably up to 100 mJ/cm$^2$ and more preferably up to 50 mJ/cm$^2$ in order to further prevent curing in a region of the liquid layer which is not irradiated with light, while also preventing sticking of a cured product to the bottom surface of the liquid tank. The lower limit of the exposure amount for light irradiation is not particularly limited, and is preferably at least 1 mJ/cm$^2$ and more preferably at least 5 mJ/cm$^2$ in terms of curability of the liquid layer.

Next, the stacked object obtained by the above procedure is subjected to light irradiation at an exposure amount of at least 3,000 mJ/cm$^2$ to obtain a three-dimensional object. When the step B is performed, the specific initiator remaining in the stacked object is photobleached to obtain the three-dimensional object having excellent transparency.

The exposure amount in this step is at least 3,000 mJ/cm$^2$. In terms of more excellent transparency of the tree-dimensional object, the exposure amount is preferably at least 5,000 mJ/cm$^2$ and more preferably at least 10,000 mJ/cm$^2$. The upper limit is not particularly limited, and is preferably up to 360,000 mJ/cm$^2$ and more preferably up to 180,000 mJ/cm$^2$ in terms of saturation of the photobleaching function of the specific initiator and prevention of deterioration of the stacked object by light.

The type of light to be used is not particularly limited as long as the specific initiator is sensitive to the light. Examples of the light include ultraviolet light and visible light. In particular, light at a wavelength of at least 350 nm but less than 400 nm is preferred in terms of optical transparency of the stacked object and absorption ability of the specific initiator.

The light source for light irradiation is also not particularly limited, and examples thereof include an LED, an LD, a high pressure mercury lamp, an ultrahigh pressure mercury lamp, a metal halide lamp, a halogen lamp, and a xenon lamp.

The step B may be optionally followed by a step C for heating the three-dimensional object obtained in the step B. The transparency of the three-dimensional object is further improved by performing the step C.

The heating temperature is preferably 50° C. or higher, and more preferably 60° C. or higher. The upper limit is not particularly limited and is preferably 100° C. or lower and more preferably 80° C. or lower in terms of heat resistance of the three-dimensional object.

The heating time is preferably 1-24 hours, and more preferably 3-10 hours.

Second Embodiment

A second embodiment of the three-dimensional object-manufacturing method has a step D to a step G as described below.

Step D: a step of manufacturing a plurality of stacked objects each having a plurality of cured layers stacked on top of each other by repeating a step D1 and a step D2 in this order, the step D1 including forming a liquid layer of the photocurable composition and the step D2 including forming a cured layer through selective irradiation of the liquid layer with light;

Step E: a step of coating surfaces of the plurality of stacked objects obtained in the step D with the photocurable composition used in the step D1;

Step F: a step of irradiating each of the plurality of stacked objects coated with the photocurable composition with light;

Step G: a step of bonding together the plurality of stacked objects obtained in the step F through the photocurable composition used in the step D1 and irradiating the resulting bonded object with light to obtain a three-dimensional object.

According to the second embodiment, the exposure amount for light irradiation in the step F or the step G is at least 3,000 mJ/cm$^2$, or a step H of irradiating each of the plurality of stacked objects with light at an exposure amount of at least 3,000 mJ/cm$^2$ is also included between the step D and the step E. The above-mentioned irradiation with light at an exposure amount of at least 3,000 mJ/cm$^2$ corresponds to photobleaching treatment as in the step B of the first embodiment. This treatment should be performed in any of the period between the step D and the step E, the step F, and the step G.

The difference between the second embodiment and the above-mentioned first embodiment is that a plurality of stacked objects are simultaneously formed by stereolithography according to the second embodiment. To be more specific, according to the second embodiment, a plurality of stacked objects are formed in the step D, and are then bonded together using the photocurable composition used in the step D1, thus manufacturing a three-dimensional object.

Usually, the step of forming a stacked object by stereolithography requires formation of a plurality of cured layers, and is therefore likely to need a longer time for manufacture. In contrast, according to the method in the second embodiment in which a portion making up a three-dimensional object is divided into segments, the segments are subjected to stereolithography, and members formed thereby are then assembled to form the three-dimensional object, the operating time at the time of stereolithography can be shortened. For example, the time required for stereolithography can be reduced approximately by half by diving a three-dimensional object to be formed into two parts, and simultaneously subjecting the parts to stereolithography.

In addition, as will be described later in detail, when a plurality of stacked objects that were formed are bonded together, the same photocurable composition as that used in the step D1 is used to bond the plurality of stacked objects together. Since the same photocurable composition is used as the material in this procedure, the refractive index and the coefficient of thermal expansion are the same in the plurality of parts and their bonding portions, and as a result, a three-dimensional object ultimately formed has excellent transparency and mechanical properties.

In stereolithography, one surface of a stacked object formed is usually in contact with the forming stage. Therefore, it is difficult to manufacture a stacked object having predetermined shapes on both surfaces, as exemplified by a biconvex lens. In contrast, as will be described later, a biconvex lens can be easily manufactured according to this embodiment.

The step D to the step H are described below in detail.

The following description refers to a mode in which two stacked objects are formed in the step D and are then bonded together, but the embodiment is not limited to this mode. For example, a three-dimensional object may be manufactured by forming three or more stacked objects in the step D and bonding them together.

Procedures of the step D are described by way of example using FIG. 5 to FIG. 8. FIG. 5 to FIG. 8 are schematic side views illustrating the respective procedures (respective steps) of the step D.

First, as illustrated in FIG. 5, a liquid tank 12 containing a liquid photocurable composition 10 is prepared. The material of the liquid tank 12 is not particularly limited as long as a light transmissive material is used. Examples thereof include glass and resin. A forming stage 14 capable of moving up and down is provided inside the liquid tank 12 at such a position as to have a predetermined height (for example, about 0.01-0.2 mm) from a bottom surface 16 of the liquid tank 12. A liquid layer L of the photocurable composition is thus formed between a lower surface of the forming stage 14 and the bottom surface 16 of the liquid tank 12 (this step corresponds to the step D1).

Next, as illustrated in FIG. 6, a mask 18c is provided under the liquid tank 12 based on the shape of a three-dimensional object to be manufactured. As a result of light irradiation from the lower side of the mask 18c, light that was not blocked out by the mask 18c reaches the liquid layer L of the photocurable composition inside the liquid tank 12 to cure the liquid layer L, thus forming two cured layers 20c on the lower surface of the forming stage 14. In other words, the liquid layer L is selectively irradiated with light to form the cured layers 20c (this step corresponds to the step D2).

The type of light to be used is not particularly limited as long as the light has a wavelength at which the photocurable composition is cured. Examples of the light include ultraviolet light and visible light. Light at a wavelength of at least 350 nm but less than 400 nm is preferred in terms of the ease of device and optical system construction, and the curability of the liquid layer.

The light source for light irradiation is also not particularly limited, and examples thereof include an LED, an LD, a high pressure mercury lamp, an ultrahigh pressure mercury lamp, a metal halide lamp, a halogen lamp, and a xenon lamp.

Next, as illustrated in FIG. 7, the forming stage 14 is moved upward by a distance corresponding to one layer (for example, about 0.01-0.2 mm) with respect to the bottom surface 16 of the liquid tank 12, and the photocurable composition 10 is introduced under the cured layers 20c to form a new liquid layer L of the photocurable composition 10 between lower surfaces of the cured layers 20c and the bottom surface 16 of the liquid tank 12 (this step corresponds to the step D1).

Next, as illustrated in FIG. 8, a mask 18d is provided under the liquid tank 12 based on the shape of the three-dimensional object to be manufactured. As a result of light irradiation from the lower side of the mask 18d, light that was not blocked out by the mask 18d reaches the liquid layer L of the photo-curable composition inside the liquid tank 12 to cure the liquid layer L, thus forming two cured layers 20d on the lower side of the cured layers 20c (this step corresponds to the step D2).

The steps in FIG. 7 and FIG. 8 are subsequently repeated to allow a plurality of cured layers to be integrally stacked to manufacture two three-dimensionally stacked objects. In other words, a plurality of stacked objects each having a plurality of cured layers stacked on top of each other can be manufactured by repeating the step D1 and the step D2.

The shape of the mask used in the above operation can be designed from data of a group of cross-sections obtained by slicing three-dimensional CAD data of a three-dimensional object to be formed into a plurality of layers.

The above description refers to the mode of light irradiation from the lower side of the liquid tank. However, this is not the sole mode but light irradiation may be performed from a lateral side or an upper side of the liquid tank in the same manner as the first embodiment.

A light irradiation method using masks has been described above, but other methods may be used as in the first embodiment.

The exposure amount for light irradiation of the liquid layer in the step D2 is not particularly limited, and is preferably up to 100 mJ/cm$^2$ and more preferably up to 50 mJ/cm$^2$ in order to further prevent curing in a region of the liquid layer which is not irradiated with light, while also preventing sticking of a cured material to the bottom surface of the liquid tank. The lower limit of the exposure amount for light irradiation is not particularly limited, and is preferably at least 1 mJ/cm$^2$ and more preferably at least 5 mJ/cm$^2$ in terms of curability of the liquid layer.

As described above, a step of irradiating each of the plurality of stacked objects obtained by the above-mentioned procedure with light at an exposure amount of at least 3,000 mJ/cm$^2$ (this step corresponds to the step H) may be performed between the step D and the step E to be described later. When the step H is performed, the specific initiator remaining in the stacked objects is photobleached to obtain the stacked objects having excellent transparency.

The exposure amount for light irradiation in this step is at least 3,000 mJ/cm$^2$. In terms of more excellent transparency of the tree-dimensional object, the exposure amount is preferably at least 5,000 mJ/cm$^2$ and more preferably at least 10,000 mJ/cm$^2$. The upper limit is not particularly limited, and is preferably up to 360,000 mJ/cm$^2$ and more preferably up to 180,000 mJ/cm$^2$ in terms of saturation of the photobleaching function of the specific initiator and prevention of deterioration of the stacked objects by light.

The type of light to be used is not particularly limited as long as the specific initiator is sensible to the light. Examples of the light include ultraviolet light and visible light. In particular, light at a wavelength of at least 350 nm but less than 400 nm is preferred in terms of optical transparency of the stacked objects and absorption ability of the specific initiator.

The light source for light irradiation is also not particularly limited, and examples thereof include an LED, an LD, a high pressure mercury lamp, an ultrahigh pressure mercury lamp, a metal halide lamp, a halogen lamp, and a xenon lamp.

Next, surfaces of the plurality of stacked objects obtained by the above-mentioned procedure are coated with the photocurable composition used in the step D1 (this step corresponds to the step E). By performing this step and the step F to be described later, surface fine irregularities of the plurality of stacked objects obtained in the step D are removed to obtain the stacked objects each having smooth surfaces.

The same photocurable composition as used in the step D1 is used in this step. In other words, the same type of photocurable composition is used in the step D1 and the step E. Owing to the use of the same photocurable composition, the stacked objects obtained in the step F have no difference in refractive index, whereby a three-dimensional object having excellent optical properties is ultimately obtained.

The method of coating the stacked object surfaces with the photocurable composition is not particularly limited, and examples thereof include known methods such as a dip coating method, a spin coating method, a spray coating method, an inkjet coating method, and a flow coating method.

The coating of the stacked object surfaces with the photocurable composition may be optionally followed by a drying process.

Next, each of the plurality of stacked objects coated with the photocurable composition is irradiated with light (this step corresponds to the step F).

The conditions of the light irradiation are not particularly limited as long as the photocurable composition used for coating may be cured under the conditions applied. The exposure amount for light irradiation is preferably at least 10 mJ/cm$^2$ and more preferably at least 20 mJ/cm$^2$. The upper limit is not particularly limited and is in general preferably up to 1,000 mJ/cm$^2$.

Examples of the type of light to be used and the type of light source to be used include those described for the step H.

As described above, when the photobleaching treatment is performed in the step F, the exposure amount for light irradiation is at least 3,000 mJ/cm$^2$. In terms of more excellent transparency of the tree-dimensional object to be obtained, the exposure amount is preferably at least 5,000 mJ/cm$^2$ and more preferably at least 10,000 mJ/cm$^2$. The upper limit is not particularly limited, and is preferably up to 360,000 mJ/cm$^2$ and more preferably up to 180,000 mJ/cm$^2$ in terms of saturation of the photobleaching function of the specific initiator and prevention of deterioration of the stacked objects by light.

Next, the plurality of stacked objects obtained in the step F are bonded together through the photocurable composition used in the step D1 and the resulting bonded object is irradiated with light to obtain a three-dimensional object (this step corresponds to the step G).

A mode as illustrated in FIG. 9 in which stacked objects 22a and 22b each having a convex surface on one side were manufactured through the step D to the step F is now described by way of example. As described above, the stacked objects 22a and 22b correspond to members that may make up a three-dimensional object.

The procedure of this step includes, for example, interposing the photocurable composition 10 between the stacked objects 22a and 22b and bonding the stacked objects 22a and 22b together to obtain a bonded object 24, as illustrated in FIG. 10. Next, the bonded object 24 obtained is irradiated with light to cure the photocurable composition 10, thus obtaining a three-dimensional object. As described above, every portion of the resulting three-dimensional object is formed of the photocurable composition of the same composition, and therefore a difference in refractive index is less likely to occur inside and the three-dimensional object has excellent transparency. Further, as described above, the photocurable composition contains the specific initiator and colors derived from the specific initiator are therefore faded by light irradiation. Accordingly, light also reaches favorably the photocurable composition 10 sandwiched between the stacked objects 22a and 22b as illustrated in FIG. 10, thus enabling uniform bonding between the stacked objects 22a and 22b. In addition, since the photocurable composition 10 sandwiched between the stacked objects 22a and 22b is made of the same materials as those of the stacked objects, the chemical bonding force is high and distortion is less likely to occur.

The conditions of the light irradiation in the step G are not particularly limited as long as the photocurable composition may be cured under the conditions applied. The exposure amount for light irradiation is preferably at least 10 mJ/cm$^2$ and more preferably at least 20 mJ/cm$^2$. The upper limit is not particularly limited and is in general preferably up to 1,000 mJ/cm$^2$.

Examples of the type of light to be used and the type of light source to be used include those described for the step H.

As described above, when the photobleaching treatment is performed in the step G, the exposure amount for light irradiation is at least 3,000 mJ/cm$^2$. In terms of more excellent transparency of the tree-dimensional object to be obtained, the exposure amount is preferably at least 5,000 mJ/cm$^2$ and more preferably at least 10,000 mJ/cm$^2$. The upper limit is not particularly limited, and is preferably up to 360,000 mJ/cm$^2$ and more preferably up to 180,000 mJ/cm$^2$ in terms of saturation of the photobleaching function of the specific initiator and prevention of deterioration of the stacked objects by light.

The step G may be optionally followed by the step C described in the first embodiment.

The three-dimensional object obtained by performing the above-mentioned procedures (in each of the first and second embodiments) has excellent transparency, has a high glass transition temperature, and is also excellent in hardness.

The internal transmittance of the three-dimensional object per 1 cm thickness in the wavelength range of 420-700 nm is preferably at least 85%, more preferably at least 90%, and even more preferably at least 95% in terms of application to optical members. The upper limit is not particularly limited and is often up to 99.9%.

It is suggested above that the internal transmittance at any wavelength of 420-700 nm is preferably at least 85%.

The internal transmittance of the three-dimensional object per 1 cm thickness in the wavelength range of 385 nm is preferably at least 85%.

The internal transmittance is measured using a spectrophotometer U4100 (Hitachi High-Technologies Corporation). The internal transmittance means a transmittance of a sample from which surface reflection losses at an incident side and an exit side are subtracted and is calculated using measured transmittance values of a pair of samples having different thicknesses, each of which measured transmittance values contains the respective surface reflection losses.

Exemplified below is a formula for calculating the internal transmittance of a sample having a thickness of 1 cm (10 mm).

$$\log T = -(\log T_1 - \log T_2)/\Delta d$$

T represents an internal transmittance, Δd (cm) represents a difference in thickness of the samples (d2−d1), $T_1$ represents a transmittance of a sample thickness d1 containing surface reflection losses, and $T_2$ represents a transmittance of a sample thickness d2 containing surface reflection losses. Meanwhile, d2>d1 is satisfied.

The glass transition temperature of the three-dimensional object is preferably 50° C. or higher and more preferably 60° C. or higher in terms of ease of handling. The upper limit is not particularly limited and is often 100° C. or lower.

The measurement method involves measuring the glass transition temperature using differential scanning calorimetry (DSC). More specifically, DSC 8500 (PerkinElmer, Inc.) is used to decrease the temperature of a measurement sample to −50° C. at a temperature decrease rate of −10° C./min. When the temperature of the measurement sample reaches −50° C., the temperature is kept for 10 minutes, and is then increased to 150° C. at a temperature increase rate of 10° C./min. This operation is repeated twice and an inflection point on a specific heat curve in the second temperature increase is regarded as the glass transition temperature.

In terms of application to various uses, the three-dimensional object preferably has a Shore D hardness of at least 60. The upper limit is not particularly limited and is often up to 100.

The hardness is measured using a durometer (HH336 manufactured by Mitutoyo Corporation).

The three-dimensional object can be applied to various uses and be advantageously applied to optical members in terms of excellent transparency.

Exemplary optical members that may be advantageously used include a spherical lens, an aspherical lens, a free-form surface lens, an eyeglass lens, a Fresnel lens, a lamp cover, an LED sealant, a prism, and a diffractive optical element. Especially, eyeglass lens is a lens which is designed to fit a spectacles frame so as to protect the eye and/or correct the sight and can be an uncorrective (also called plano or afocal lens) or corrective eyeglass lens. Corrective lens may be a unifocal, a bifocal, a trifocal or a progressive lens.

EXAMPLES

The photocurable composition and the three-dimensional object-manufacturing method are described below in further detail with reference to examples and comparative examples. However, the present invention should not be construed as being limited to these examples.

Example A

Examples 1 to 17 and Comparative Examples 1 to 2

Respective ingredients shown in Table 1 were mixed and the resulting mixture was heated at 60° C. for 30 minutes to prepare a photocurable composition in each of Examples and Comparative Examples.

Next, each photocurable composition obtained was placed in a silicon rubber mold and irradiated with light at a wavelength of 385 nm for 5 minutes to obtain a cured layer (thickness: 2 mm).

The properties of the photocurable composition in each of Examples and Comparative Examples, and those of the cured layer formed using each photocurable composition were evaluated according to the procedures described below.

(Transmittance)

A spectrophotometer U4100 (Hitachi High-Technologies Corporation) was used to measure the transmittance (%) of the cured layer obtained from each photocurable composition per 2 mm thickness at a wavelength of 420 nm and the transmittance was evaluated according to the criteria described below.

AA: The transmittance is 90% or more.

A: The transmittance is 85% or more but less than 90%.

B: The transmittance is less than 85%.

(Hardness)

A durometer (HH336 manufactured by Mitutoyo Corporation) was used to measure the Shore D hardness of the cured layer obtained from each photocurable composition and the Shore D hardness was evaluated according to the criteria described below.

A: The Shore D hardness is 60 or more.

B: The Shore D hardness is less than 60.

(Glass Transition Temperature)

A thermal mechanical analyzer (TMA) was used to measure the glass transition temperature of each cured layer and the glass transition temperature was evaluated according to the criteria described below.

The details of the method of measuring the glass transition temperature are as follows:

DSC 8500 (PerkinElmer, Inc.) was used to decrease the temperature of a measurement sample to −50° C. at a temperature decrease rate of −10° C./min. When the temperature of the measurement sample reaches −50° C., the temperature was kept for 10 minutes, and was then increased to 150° C. at a temperature increase rate of 10° C./min. This operation was repeated twice and an inflection point on a specific heat curve in the second temperature increase was regarded as the glass transition temperature.

AA: The glass transition temperature is 60° C. or higher.

A: The glass transition temperature is 50° C. or higher but lower than 60° C.

B: The glass transition temperature is lower than 50° C.

(Viscosity)

A viscometer (VM-10A manufactured by Sekonic Corporation) was used to measure the viscosity (mPa.$) at 25° C. of each photocurable composition.

(Minimum Curing Energy (Ec) and Cured Thickness (Dp))

A 3D printer Pico 2 (ASIGA) including a light source emitting light at a wavelength of 385 nm (10 mW/cm$^2$) was used to change the exposure amount for each photocurable composition and to calculate the thickness of the cured layer obtained at that time. The minimum curing energy (Ec) necessary to cause the photocurable composition to cure and the minimum cured thickness (Dp) of the cured layer were calculated based on the plot of exposure amount vs. thickness.

When the photocuring composition is applied to stereolithography, Ec and Dp are preferably less than 20 mJ/cm$^2$ and up to 500 micrometers, respectively.

The photocurable composition produced in each of Examples had an internal transmittance at 385 nm of less than 1% per 1 cm thickness.

TABLE 1

| Table 1-1 | Type | Comparative Example 1 | Comparative Example 2 | Example 1 | Example 2 | Example 3 | Example 4 | Example 5 | Example 6 | Example 7 | Example 8 | Example 9 |
|---|---|---|---|---|---|---|---|---|---|---|---|---|
| Specific monofunctional monomer | IBXA (wt %) |  | 72 | 71 | 49 | 25 | 48 | 18 |  |  | 48 |  |
|  | AADE (wt %) |  |  |  |  |  |  |  | 50 | 20 |  | 50 |
| Polyfunctional monomer | ADCP (wt %) | 98 | 27 | 27 | 49 |  | 48 |  | 46 |  |  |  |
|  | DCP (wt %) |  |  |  |  | 73 |  | 77 |  | 76 |  |  |
|  | AHDN (wt %) |  |  |  |  |  |  |  |  |  | 49 | 45 |
|  | ADDA (wt %) |  |  |  |  |  |  |  |  |  |  |  |
|  | ABPE4 (wt %) |  |  |  |  |  |  |  |  |  |  |  |
|  | ANODN (wt %) |  |  |  |  |  |  |  |  |  |  |  |
| Specific initiator | TPO (wt %) | 1 | 1 | 1 | 1 | 1 | 1 | 1 | 1 | 1 | 1 | 2 |
| Alchohol | 3M2B1O (wt %) | 1 |  | 1 | 1 | 1 | 3 | 4 | 3 | 3 | 2 | 3 |
| Evaluation | Transmittance | B | B | A | A | A | AA | AA | AA | AA | AA | AA |
|  | Glass transition temperature (° C.) | AA | — | AA | AA | AA | AA | AA | AA | AA | AA | AA |
|  | Shore D | A | — | A | A | A | A | A | A | A | A | A |
|  | Viscosity (mPa · s) | 139 | 40 | 40 | 70 | 75 | 70 | 8 | 39 | 46 | 10 | 10 |
|  | Ec(mJ/cm$^2$) | 9 | 7 | 16 | 11 | 15 | 11 | 15 | 19 | 16 | 13 | 11 |
|  | Dp(μm) | 354 | 314 | 386 | 384 | 429 | 384 | 410 | 454 | 466 | 424 | 223 |

TABLE 2

| Table 1-2 | Ingredient | Example 10 | Example 11 | Example 12 | Example 13 | Example 14 | Example 15 | Example 16 | Example 17 |
|---|---|---|---|---|---|---|---|---|---|
| Specific monofunctional monomer | IBXA (wt %) | 73 | 49 | 25 | 48 | 25 | 93 | 88 | 87.75 |
|  | AADE (wt %) |  |  |  |  |  |  |  |  |
| Polyfunctional monomer | ADCP (wt %) |  |  |  |  |  |  |  |  |
|  | DCP (wt %) |  |  |  |  |  |  |  |  |
|  | AHDN (wt %) |  | 49 | 73 |  |  |  |  |  |
|  | ADDA (wt %) | 25 |  |  |  |  | 5 | 10 |  |
|  | ABPE4 (wt %) |  |  |  |  |  |  |  | 10 |
|  | ANODN (wt %) |  |  |  | 49 | 73 |  |  |  |
| Specific initiator | TPO (wt %) | 1 | 1 | 1 | 1 | 1 | 1 | 1 | 2 |
| Alcohol | 3M2B1O (wt %) | 1 | 1 | 1 | 1 | 1 | 1 | 1 | 0.25 |
| Evaluation | Transmittance | A | A | A | AA | AA | AA | AA | AA |
|  | Glass transition temperature (° C.) | AA | AA | AA | A | A | AA | AA | AA |
|  | Shore D | A | A | A | A | A | A | A | A |
|  | Viscosity (mPa · s) | 127 | 8 | 10 | 8 | 10 | 28 | 53 | 17 |
|  | Ec(mJ/cm$^2$) | 16 | 13 | 11 | 14 | 11 | 19 | 17 | 8 |
|  | Dp(μm) | 441 | 418 | 412 | 427 | 380 | 268 | 325 | 193 |

Hyphens "-" in an evaluation column of Table 1 above mean that no measurement is performed.

The respective symbols in Table 1 above refer to the following compounds.

Numerical values in ingredient columns of Table 1 represent the amounts (wt %) of the respective ingredients with respect to the total weight of the photocurable composition.

IBXA: isobornyl acrylate
AADE: dicyclopentanyl acrylate
ADCP: tricyclodecane dimethanol diacrylate (density: 1.10)
DCP: tricyclodecane dimethanol dimethacrylate (density: 1.07)
AHDN: 1.6-hexanediol diacrylate (density: 1.02)
ADDA: 1.3-adamantanediol diacrylate (density: 1.17)
ABPE4: ethoxylated bisphenol A diacrylate (density: 1.14)
ANODN: 1,9-nonanediol diacrylate (density: 0.98)

[Chem. 8]

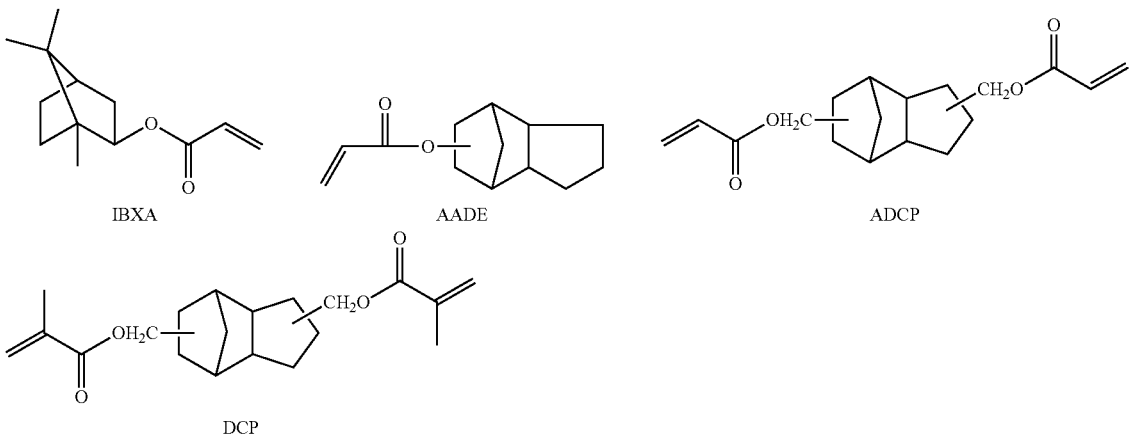

[Chem. 9]

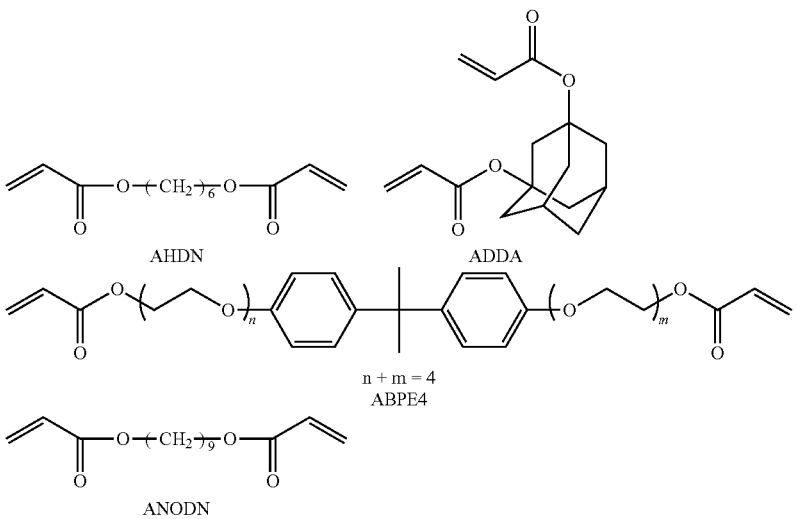

TPO: 2,4,6-trimethylbenzoyl-diphenylphosphine oxide
3M2B1O: 3-methyl-2-buten-1-ol Even when the 3-methyl-2-buten-1-ol in Example 5 was replaced by 2-methyl-2-propen-1-ol, a photocurable composition having the same properties as in Example 5 was obtained.

When the TPO in Example 1 was replaced by polymerization initiators other than the specific initiator, as exemplified by Irgacure 369E, Irgacure OXE1, and Irgacure 651, the transparency was rated as "B" and a desired effect could not be obtained.

As shown in Table 1 above, it was confirmed that the cured layers obtained from the photocurable compositions shown in Examples 1-17 each have excellent transparency, a high glass transition temperature, and an excellent hardness. It was also confirmed that the photocurable compositions shown in Examples 1-17 each have the viscosity, Ec and Dp within the ranges applicable to stereolithography.

In particular, it was confirmed from the comparison of Examples 1 to 9 that the transparency is more excellent when the polyfunctional monomer is a compound represented by formula (2) above, and the alcohol content is 2-4 wt % with respect to the total weight of the photocurable composition (Examples 4-9).

It was also confirmed from the comparison of Examples 13 and 14 with the other Examples that the glass transition temperature is more excellent when the polyfunctional monomer has a density of 1.00 or more (cases other than Examples 13 and 14).

It was further confirmed from the comparison of Examples 10 to 17 that the transparency and the glass transition temperature are more excellent when the polyfunctional monomer is a compound represented by formula (3) above, and the monofunctional monomer content is at least 75 wt % with respect to the total weight of the photocurable composition (Examples 15 to 17).

Example B

Next, the photocurable composition described in Example 4 was used to fabricate a three-dimensional object according to the above-mentioned three-dimensional object-manufacturing method in the first embodiment.

To be more specific, first of all, a 3D printer Pico 2 (ASIGA) including a light source emitting light at a wavelength of 385 nm (10 mW/cm$^2$) was used to obtain a stacked object through stereolithography. Stereolithography using Pico 2 was performed by the same procedures as in the above-mentioned step A described with reference to FIG. 1 to FIG. 4. In stereolithography, circular cured layers each having a diameter of 20 mm and a thickness of 100 micrometers were repeatedly stacked on top of each other until the stacked object had a thickness of 10 mm. The exposure amount for light irradiation during formation of each cured layer was 20 mJ/cm².

Next, the resulting stacked object was taken out and irradiated with light using a desktop UV-LED lighting (wavelength: 385 nm; LED 385-SPT manufactured by Optocode Corporation). The exposure amount for light irradiation was 18,000 mJ/cm².

Next, the stacked object having undergone exposure treatment was heated at 60° C. for 6 hours to fabricate a transparent three-dimensional object.

In the thus formed three-dimensional object, the internal transmittance in the wavelength range of 420-700 nm per 1 cm thickness was at least 95%, and the glass transition temperature and the Shore D hardness also had approximately the same values as those in the cured layer measured in Table 1. The internal transmittance of the formed three-dimensional object per 1 cm thickness in the wavelength range of 385 nm was at least 85%. These results confirmed that a desired three-dimensional object is obtained according to this embodiment.

Even when the photocurable composition in Example 4 was replaced by the photocurable compositions in Examples 1 to 3, and 5 to 17 to fabricate three-dimensional objects according to the above-mentioned procedures, it was confirmed that three-dimensional objects having approximately the same physical property values as those of each cured layer measured in Table 1 are obtained.

To be more specific, as in the results of Table 1, the three-dimensional objects formed using the photocurable compositions in Examples 4 to 9 exhibited excellent transparency among the three-dimensional objects formed using the photocurable compositions in Examples 1 to 9. The three-dimensional objects formed using the photocurable compositions in Examples 15 to 17 exhibited excellent transparency and glass transition temperature among the three-dimensional objects formed using the photocurable compositions in Examples 10 to 17.

In contrast, when the photocurable compositions in Comparative Examples 1 and 2 were used, only the three-dimensional objects each having a low internal transmittance and poor transparency were obtained.

Example C

Next, the photocurable composition described in Example 4 was used to fabricate a three-dimensional object according to the above-mentioned three-dimensional object-manufacturing method in the second embodiment.

To be more specific, first of all, a 3D printer Pico 2 (ASIGA) including a light source emitting light at a wavelength of 385 nm (10 mW/cm²) was used to obtain stacked objects through stereolithography. Stereolithography using Pico 2 was performed by the same procedures as in the above-mentioned step D described with reference to FIG. 5 to FIG. 8. Specifically, in order to obtain the convex stacked objects 22a and 22b illustrated in FIG. 9, circular cured layers each having a thickness of 25 micrometers were repeatedly stacked on top of each other in stereolithography until the stacked object had a thickness of 10 mm. The exposure amount for light irradiation during formation of each cured layer was 10 mJ/cm². The resulting convex stacked objects each had a maximum diameter of 20 mm.

Next, surfaces of the resulting two stacked objects were coated with the photocurable composition described in Example 4 and the two stacked objects coated with the photocurable composition were irradiated with light using a desktop UV-LED lighting (wavelength: 385 nm; LED 385-SPT manufactured by Optocode Corporation) to cure the photocurable composition used for coating. The exposure amount for light irradiation was 18,000 mJ/cm². In this step, photobleaching treatment was also performed. In other words, the exposure amount for light irradiation in the step F was at least 3,000 mJ/cm².

Next, as illustrated in FIG. 10, the photocurable composition described in Example 4 was interposed between the resulting two stacked objects to bond the stacked objects together, and the resulting bonded object was irradiated with light using the desktop UV-LED lighting (wavelength: 385 nm; LED 385-SPT manufactured by Optocode Corporation) to obtain a three-dimensional object. The exposure amount for light irradiation was 20 mJ/cm².

The resulting three-dimensional object was heated at 60° C. for 6 hours. In the thus formed three-dimensional object, the internal transmittance per 1 cm thickness in the wavelength range of 420-700 nm was at least 95%, and the glass transition temperature and the Shore D hardness also had approximately the same values as those in the cured layer measured in Table 1. These results confirmed that a desired three-dimensional object is obtained according to this embodiment.

Even when the photocurable composition in Example 5 was replaced by the photocurable compositions in Examples 1 to 3, and 5 to 17 to fabricate three-dimensional objects according to the above-mentioned procedures, it was confirmed that three-dimensional objects having approximately the same physical property values as those of each cured layer measured in Table 1 are obtained.

REFERENCE SINGS LIST

10 photocurable composition
12 liquid tank
14 forming stage
16 bottom surface
18a, 18b, 18c, 18d mask
20a, 20b, 20c, 20d cured layer
22a, 22b stacked object
24 bonded object

The invention claimed is:

1. A photocurable composition used to manufacture a three-dimensional object which is formed by stacking a plurality of layers on top of each other, the photocurable composition comprising:
   a monofunctional monomer having a polycyclic aliphatic group;
   a polyfunctional monomer;
   an alcohol; and
   an acylphosphine oxide photopolymerization initiator,
   wherein a content of the monofunctional monomer of the photocurable composition is 5-95 wt % with respect to a total weight of the photocurable composition,
   a content of the polyfunctional monomer of the photocurable composition is 5-95 wt % with respect to the total weight of the photocurable composition, and
   a content of a compound having a molecular weight of 2,000 g/mol or more of the photocurable composition is up to 1 wt % with respect to the total weight of the photocurable composition wherein the alcohol is a compound represented by formula (1):

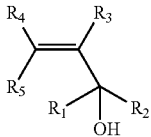

Formula (1)

in formula (1), $R_1$ and $R_2$ each represent a hydrogen atom, or one of $R_1$ and $R_2$ represents a hydrogen atom, and the other is taken together with $R_5$ to form a ring; $R_3$ to $R_5$ each independently represent a hydrogen atom or an alkyl group optionally substituted with a hydroxy group; and the alkyl group optionally further contains an ether group, an ester group, or a ketone group.

2. The photocurable composition according to claim 1, wherein the polyfunctional monomer has a density of at least 1.00.

3. The photocurable composition according to claim 1, wherein the polyfunctional monomer is a compound represented by formula (2):

Formula (2)

(where, in formula (2), each $R_{10}$ independently represents a polymerizable group; $L_1$ represents a divalent group containing a structure represented by formula (A):

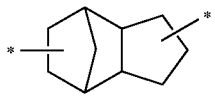

Formula (A)

* represents a bonding position, or an alkylene group containing 3-8 carbon atoms, and
the alcohol is contained in an amount of 2-4 wt % with respect to a total weight of the photocurable composition.

4. The photocurable composition according to claim 1, wherein the polyfunctional monomer is a compound represented by formula (3):

Formula (3)

where, in formula (3), each $R_{10}$ independently represents a polymerizable group; $L_2$ represents a divalent group containing an adamantane ring structure or a divalent group containing a structure represented by formula (B):

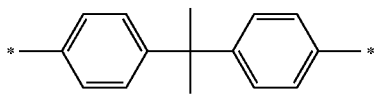

Formula (B)

* represents a bonding position, and
the monofunctional monomer is contained in an amount of 75-95 wt % with respect to the total weight of the photocurable composition.

5. The photocurable composition according to claim 1, wherein a weight ratio of the acylphosphine oxide photopolymerization initiator to the alcohol is 0.1-10.

6. The photocurable composition according to claim 1, wherein the photocurable composition has an internal transmittance per 1 cm thickness at 385 nm of less than 1%, and
the three-dimensional object formed by using the photocurable composition has an internal transmittance per 1 cm thickness at 385 nm of at least 85%.

7. The photocurable composition according to claim 1, wherein the three-dimensional object is an optical member.

8. A three-dimensional object-manufacturing method, comprising:
a step A of manufacturing a stacked object having a plurality of cured layers stacked on top of each other by repeating a step A1 and a step A2 in this order, the step A1 including forming a liquid layer of the photocurable composition according to claim 1, and the step A2 including forming a cured layer through selective irradiation of the liquid layer with light; and
a step B of obtaining a three-dimensional object through irradiation of the stacked object with light at an exposure amount of at least 3,000 $mJ/cm^2$.

9. The three-dimensional object-manufacturing method according to claim 8, wherein the step B is followed by a step C of heating the three-dimensional object.

10. The three-dimensional object-manufacturing method according to claim 8, wherein irradiation with light in the step A2 is performed at an exposure amount of up to 50 $mJ/cm^2$.

11. The three-dimensional object-manufacturing method according to claim 8, wherein the three-dimensional object is an optical member.

12. A three-dimensional object-manufacturing method, comprising:
a step D of manufacturing a plurality of stacked objects each having a plurality of cured layers stacked on top of each other by repeating a step D1 and a step D2 in this order, the step D1 including forming a liquid layer of the photocurable composition according to claim 1, and the step D2 including forming a cured layer through selective irradiation of the liquid layer with light;
a step E of coating surfaces of the plurality of stacked objects obtained in the step D with the photocurable composition used in the step D1;
a step F of irradiating each of the plurality of stacked objects coated with the photocurable composition with light; and
a step G of bonding together the plurality of stacked objects obtained in the step F through the photocurable composition used in the step D1 and irradiating a resulting bonded object with light to obtain a three-dimensional object,
wherein an exposure amount for irradiation with light in the step F or the step G is at least 3,000 $mJ/cm^2$, or
wherein a step H of irradiating each of the plurality of stacked objects with light at an exposure amount of at least 3,000 $mJ/cm^2$ is included between the step D and the step E.

13. The three-dimensional object-manufacturing method according to claim 12, wherein irradiation with light in the step D2 is performed at an exposure amount of up to 50 $mJ/cm^2$.

* * * * *